United States Patent [19]

Abe et al.

[11] Patent Number: 5,164,435
[45] Date of Patent: Nov. 17, 1992

[54] STABILIZED THERMOPLASTIC PPO RESIN COMPOSITION

[75] Inventors: Hiroomi Abe; Kenji Nagaoka; Yasuro Suzuki; Takashi Sanada, all of Chiba, Japan

[73] Assignee: Sumitomo Chemical Company, Limited, Osaka, Japan

[21] Appl. No.: 762,487

[22] Filed: Sep. 19, 1991

[30] Foreign Application Priority Data

Oct. 2, 1990 [JP] Japan ................. 2-266017

[51] Int. Cl.$^5$ ............................................. C08K 5/36
[52] U.S. Cl. ........................................ 524/100; 524/108; 524/288; 524/291; 524/302; 524/303; 524/304; 524/343; 524/351; 524/353; 524/611
[58] Field of Search ............... 524/100, 108, 288, 291, 524/343, 351, 353, 302, 303, 304, 611; 525/92, 93, 96; 544/220

[56] References Cited

U.S. PATENT DOCUMENTS

| | | |
|---|---|---|
| 3,578,625 | 5/1971 | Nakashio et al. .................. 524/304 |
| 3,758,549 | 9/1973 | Dexter et al. ..................... 524/302 |
| 3,816,562 | 6/1974 | Holoch et al. . | 
| 4,002,701 | 1/1977 | Katchman . |
| 4,309,335 | 1/1982 | Akutsu et al. ..................... 524/611 |
| 4,507,417 | 3/1985 | Ishii et al. ........................ 524/108 |
| 4,576,734 | 3/1986 | Ishii et al. ........................ 524/108 |
| 4,772,664 | 9/1988 | Ueda et al. ........................ 525/92 |
| 4,997,612 | 3/1991 | Gianchandai et al. ............. 525/92 |
| 5,047,461 | 9/1991 | Takata et al. ..................... 524/303 |

FOREIGN PATENT DOCUMENTS 68784 12/1973 Poland .
68791 1/1974 Poland .
458556 9/1975 U.S.S.R. .

OTHER PUBLICATIONS

CA Abstract No: 82(08):44389F.
CA Abstract No. 81(24):153715J.

*Primary Examiner*—Veronica P. Hoke
*Attorney, Agent, or Firm*—Cushman, Darby & Cushman

[57] ABSTRACT

A stabilized thermoplastic resin composition is provided which comprises the following components (i), (ii) and (iii):

(i) 100 parts by weight, based on the total amount of the following (A), (B) and (C), of a mixture comprising (A) about 10-100% by weight of a polyphenylene ether, (B) 0-about 90% by weight of an alkenyl aromatic resin, and (C) 0-about 90% by weight of a crystalline thermoplastic resin, total amount of (A) and (B) being at least about 15% by weight of the total amount of (A), (B) and (C), (ii) 1-50 parts by weight of an alkenyl aromatic elastomer (non-hydrogenated), and (iii) a stabilizer comprising (D) 0.01-5 parts by weight of a sulfur compound and (E) 0.01-5 parts by weight of at least one phenol compound.

10 Claims, No Drawings

STABILIZED THERMOPLASTIC PPO RESIN COMPOSITION

The present invention relates to a resin composition containing a stabilizer which imparts superior stability to a resin composition comprising a polyphenylene ether and an alkenyl aromatic elastomer.

It has been well known to add alkenyl aromatic elastomers to polyphenylene ether/polystyrene compositions in order to improve impact strength. However, it has also been well known that these compositions have problems in stability that they are deteriorated by actions such as of heat, light and oxygen during processing or using to result in phenomena such as softening, embrittlement, surface cracking and discoloration and as a result, mechanical properties are considerably deteriorated.

Furthermore, recently resin compositions of high performance are demanded in various fields and many polymer alloys comprising the above-mentioned compositions combined with other crystalline thermoplastic resins are put to practical use. These polymer alloys are often exposed to higher temperatures during production and processing and are required to have higher stability.

In order to solve these problems, it has also been well known to add various phenolic, phosphorus or sulfur antioxidants during preparation and processing of synthetic resins. There have been known, for example, use of one of phenol antioxidants such as 2,6-di-t-butyl-4-methylphenol, 2,2-methylenebis(4-methyl-6-t-butylphenol), 4,4'-butylidenebis(3-methyl-6-t-butylphenol), n-octadecyl 3-(3,5-di-t-butyl-4-hydroxyphenyl)propionate, 1,1,3-tris(2-methyl-4-hydroxy-5-t-butylphenyl)butane, pentaerythritol, tetrakis[3-(3,5-di-t-butyl-4-hydroxyphenyl)propionate], use of these phenolic antioxidants in combination with phosphorus antioxidants such as tris(nonylphenyl) phosphite and distearylpentaerythritol diphosphite, and use of the above phonolic antioxidants in combination with sulfur antioxidants such as dilauryl thiodipropionate, dimyristyl thiodipropionate, and distearyl thiodipropionate.

Moreover, in order to improve heat stability of mixtures of polyphenylene ether and styrene polymers, it has been known to use various compounds such as organic phosphites and phosphates, diphenylamine derivatives, mercaptobenzimidazole, hexamethylenephosphoramide, monohydroxydithiopropanoic acid, and aliphatic alcohols as disclosed in U.S. Pat. Nos. 3,816,562 and 4,002,701 and Polish Patent Nos. 68,784 and 68,791.

Furthermore, in order to improve heat stability of the composition when polyamides are used as the crystalline thermoplastic resins, it has been known to use hindered phenols such as N,N'-hexamethylenebis(3,5-di-t-butyl-4-hydroxyhydrocinnamide or aromatic amines such as phenyl α-naphthylamine, phenyl β-naphthylamine, N,N'-β-naphthyl p-phenylenediamine and N,N'-diphenyl p-phenylenediamine.

However, these methods have not been satisfactory in heat and oxidative stability, heat discoloration resistance and evaporation of additives.

The object of the present invention is to provide a resin composition having high performance and high heat stability which contains a polyphenylene ether and free from the above-mentioned problems.

As a result of intensive research in an attempt to solve the problems, the inventors have found that a surprising synergistic effect which can never be expected from the conventional combination of antioxidants can be obtained by adding a specific sulfur compound and a specific phenol compound to a resin composition containing polyphenylene ether/alkenyl aromatic elastomer and have further found that the resin composition has heat stability and oxidative stability markedly superior to those of conventional techniques and besides heat decomposition of these stabilizers occur quite a little. Thus, the present invention has been accomplished.

That is, the present invention relates to a stabilized thermoplastic resin composition, characterized by comprising the following components (i), (ii) and (iii):

(i) 100 parts by weight, based on the total amount of the following (A), (B) and (C), of a mixture comprising (A) about 10-100% by weight of a polyphenylene ether, (B) 0-about 90% by weight of an alkenyl aromatic resin, and (C) 0-about 90% by weight of a crystalline thermoplastic resin, total amount of (A) and (B) being at least about 15% by weight of the total amount of (A), (B) and (C), (ii) 1-50 parts by weight of an alkenyl aromatic elastomer (non-hydrogenated), and (iii) a stabilizer comprising (D) 0.01-5 parts by weight of a sulfur compound represented by the following formula (I) and (E) 0.01-5 parts by weight of at least one phenol compound represented by the following formulas (II)1-(II)-4, (III) and (IV), the weight ratio of (D):(E) being 1:0.1-5,

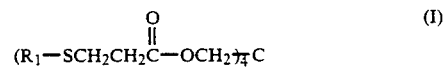

(wherein R₁ represents an alkyl group of 4-20 carbon atoms),

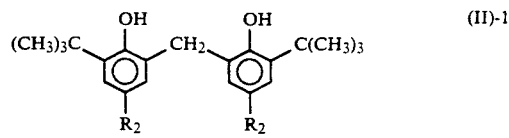

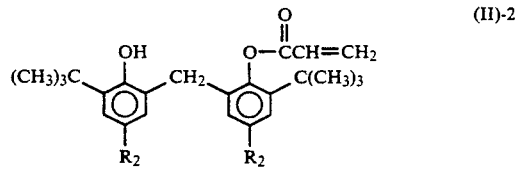

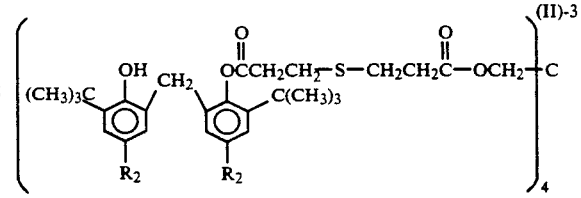

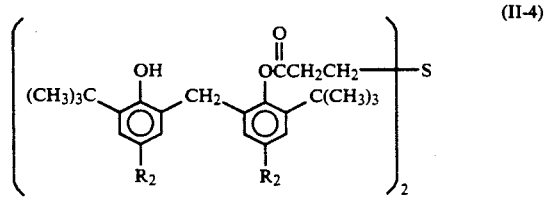

(wherein R₂ represents an alkyl group of 1-4 carbon atoms),

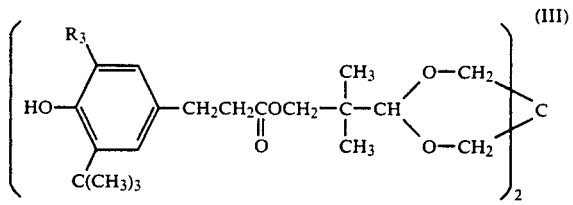

(wherein R₃ represents an alkyl group of 1-3 carbon atoms),

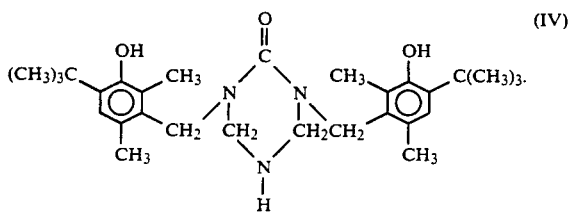

The polyphenyl ether (i) (A) used in the present invention is a polymer obtained by oxidation polymerization of at least one phenol compound represented by the following formula:

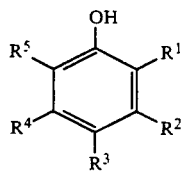

(wherein $R^1$, $R^2$, $R^3$, $R^4$ and $R^5$ each represents a hydrogen atom, a halogen atom, a hydrocarbon group, or a substituted hydrocarbon group, with a proviso that at least one of $R^1$-$R^5$ is a hydrogen atom) with oxygen or an oxygen-containing gas using an oxidation coupling catalyst.

Examples of $R^1$, $R^2$, $R^3$, $R^4$ and $R^5$ in the above formula include hydrogen, chlorine, bromine, fluorine, iodine, methyl, ethyl, n- or iso-propyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the phenol compound represented by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol, and 2-methyl-6-allylphenol. Furthermore, copolymers of any of these phenols and phenol compounds other than these phenols, for example, polyhydroxy aromatic compounds such as bisphenol A, tetrabromobisphenol A, resorcin, hydroquinone, and novolak resin may also be employed.

Among these compounds, preferred are homopolymers of 2,6-dimethylphenol or 2,6-diphenylphenol and copolymers of a major amount of 2,6-xylenol and a minor amount of 3-methyl-6-t-butylphenol or 2,3,6-trimethylphenol.

Any oxidation coupling catalysts may be used for oxidation polymerization of the phenol compounds, as long as it has polymerization ability. Typical examples thereof are cuprous salt-tert. amine such as cuprous chloride-triethylamine and cuprous chloride-pyridine; cupric salt-amine-alkali metal hydroxide such as cupric chloride-pyridine-potassium hydroxide; manganese salt-primary amine such as manganese chloride-ethanolamine and manganese acetate-ethylenediamine; manganese salt-alcolate or phenolate such as manganese chloride-sodium methylate and manganese chloride-sodium phenolate; and cobalt salt-tert. amine.

It has been known that polyphenylene ethers obtained by oxidation polymerization differ in properties when the polymerization is carried out at higher than 40° C. (high temperature polymerization) and when it is carried out at 40° C. or lower (low temperature polymerization). Either temperature may be employed in the present invention.

The alkenyl aromatic resins (i) (B) are those which are partly or wholly derived from alkenyl aromatic compounds represented by the following formula:

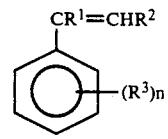

wherein $R^1$ and $R^2$ are independently selected from the group consisting of lower alkyl and alkenyl of 1-6 carbon atoms and hydrogen, n is an integer of 1-5 and $R^3$ is selected from the group consisting of hydrogen, chlorine, bromine and lower alkyl of 1-6 carbon atoms and when n is an integer of 2-5, $R^3$ may be identical or different.

Compounds represented by the above formula include, for example, α-methylstyrene, p-methylstyrene, 2,4-dimethylstyrene, chlorostyrenes (such as mono-, di- and tri-), p-tert butylstyrene and p-ethylstyrene, but these are not limitative.

Examples of the alkenyl aromatic resins (B) are polystyrene resins, rubber-reinforced polystyrene resins, poly-α-methylstyrene resins, poly-p-methylstyrene resins, and copolymers of styrene with at least one of other monomers (such as butadiene and acrylonitrile), namely, HIPS generally called high-impact polystyrene resin, styrene-acrylonitrile copolymer and the like.

The crystalline thermoplastic resin (i) (C) is at least one resin selected from polyethylene, polypropylene, polyamide, thermoplastic polyester, polyacetal, polyphenylene sulfide and polyether ether ketone.

The polyethylene is a crystalline polyethylene and includes, for example, low-density polyethylene, medium-density polyethylene, high-density polyethylene and straight chain low-density polyethylene.

The polypropylene is a crystalline polypropylene and includes, in addition to homopolymers of propylenes, block or random copolymers of propylenes, for example, α-olefins such as ethylene and butene-1. Homopolymers and block or random copolymers of propylenes can usually be obtained by reacting the monomers in the presence of a catalyst, for example, one which comprises combination of a titanium halide compound and an alkylaluminum compound generally called Ziegler-Natta catalyst.

The polyamide resins include those which are obtained by polycondensation of lactams of 3- or more membered ring, polymerizable ω-amino acids, dibasic acids with diamines, and the like. Examples thereof are polymers of ε-caprolactam, aminocaproic acid, enantholactam, 7-aminoheptanoic acid, 11-aminoundecanoic aic, and the like and polymers obtained by polycondensation of diamines such as hexamethylenediamine, nonamethylenediamine, undecamethylenediamine, dodecamethylenediamine, and m-xylylenediamine with dicarboxylic acids such as terephthalic acid, isophthalic acid, adipic acid, sebacic acid, dibasic dodecanoic acid, and glutaric acid or copolymers thereof.

Typical examples of the polyamides are aliphatic polyamides such as polyamide 6, polyamide 6,6, polyamide 6,10, polyamide 11, polyamide 12, and polyamide 6,12 and aromatic polyamides such as polyhexamethylenediamine terephthalamide, polyhexamethylenediamine isophthalamide and xylene group-containing polyamides. These may also be used as mixtures of two or more or copolymers.

The thermoplastic polyesters comprise a dicarboxylic acid component, at least 40 mol % of which is terephthalic acid and a diol component. The dicarboxylic acid component other than terephthalic acid includes one or more of aliphatic dicarboxylic acids of 2-20 carbon atoms such as adipic acid, sebacic acid and dodecanedicarboxylic acid, aromatic dicarboxylic acids such as isophthalic acid and naphthalenedicarboxylic acid, and alicyclic dicarboxylic acids such as cyclohexanedicarboxylic acid. The diol components include one or more of aliphatic glycols, alicyclic glycols and aromatic glycols such as ethylene glycol, 1,3-propanediol, 1,4-butanediol, 1,6-hexanediol, 1,10-decanediol, 1,4-cyclohexanediol and 4,4'-dihydroxydiphenyl.

Among these thermoplastic polyesters, especially polybutylene terephthalate or polyethylene terephthalate exhibits higher effect of the present invention.

In case of using these crystalline thermoplastic resins, they are desired to form a matrix phase. Furthermore, it is desired to add a compatibilizing agent which makes it possible to disperse polyphenylene ether and others as sufficiently fine disperse phases in the matrix phase.

The alkenyl aromatic elastomers (non-hydrogenated) (ii) contain the above-mentioned alkenyl aromatic compounds and examples are copolymers of the alkenyl aromatic compounds with butadiene, isoprene and the like which have rubber-like properties.

Typical examples of the elastomers (ii) are styrene-butadiene copolymer rubber, styrene-isoprene copolymer rubber, styrene-butadiene block copolymer (SB), styrene-butadiene-styrene block copolymer (SBS), styrene-isoprene block copolymer (SI), and styrene-isoprene-styrene block copolymer (SIS).

The sulfur compounds (iii) [D] are represented by the formula (I):

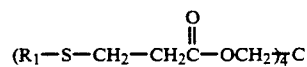
(I)

wherein the substituent $R_1$ is preferably an alkyl group of 3-18 carbon atoms from the point of heat and oxidation stability and especially preferably a dodecyl group.

Typical examples of these compounds are shown in Table 1.

TABLE 1

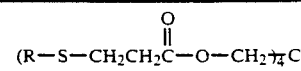

| No. | R |
|---|---|
| I-1 | $-C_6H_{13}$ |
| I-2 | $-C_{12}H_{25}$ |
| I-3 | $-C_{18}H_{37}$ |

The phenol compound (iii) (E) are represented by the formula (II)-1–(II)-4, (III) or (IV).

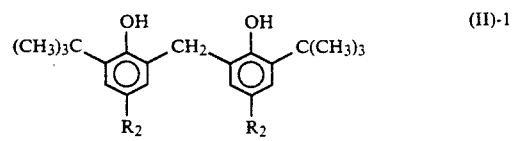
(II)-1

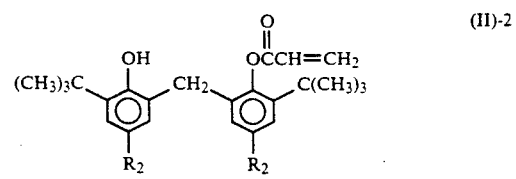
(II)-2

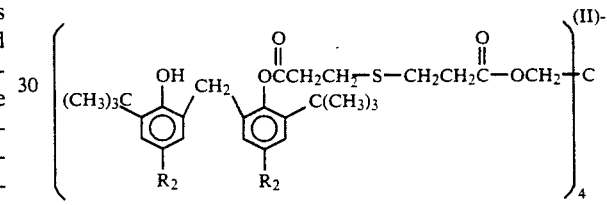
(II)-3

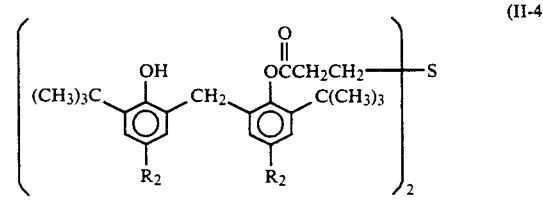
(II-4)

(wherein $R_2$ represents an alkyl group of 1-4 carbon atoms).

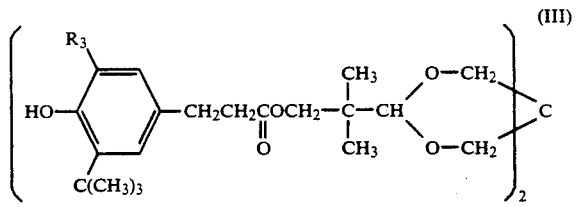
(III)

(wherein $R_3$ represents an alkyl group of 1-3 carbon atoms)

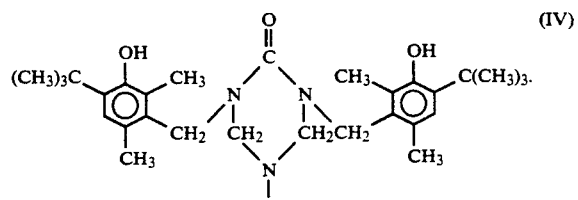
(IV)

The substituent $R_2$ in the phenol compounds represented by the formula (II)-1 is preferably a methyl group or an ethyl group, and especially preferably a methyl group, considering function as an antioxidant.

The phenol compounds represented by the formula (II)-2 which are derivatives of the phenol compounds represented by the formula (II)-1 can be prepared by allowing 2,2'-methylenebis(6-t-butyl-4-alkylphenol) to react with acrylic acid or lower alkyl esters or acid chlorides thereof by a conventional process.

Typical examples of the phenol compounds (II)-2 are shown in Table 2.

TABLE 2

| No. | $R_2$ |
|---|---|
| II-2-1 | $-CH_3$ |
| II-2-2 | $-CH_2CH_3$ |
| II-2-3 | $-CHCH_2CH_3$ with $CH_3$ |
| II-2-4 | $-C(CH_3)_3$ |

The phenol compounds represented by the formulas (II)-3 and (II)-4 can be prepared by allowing the compounds represented by the formula (II)-1 to react with pentaerythritol-3-mercaptopropionic acid ester represented by the following formula (IV) or 3,3'-thiodipropionic acid or lower alkyl esters or acid chlorides thereof by a conventional process.

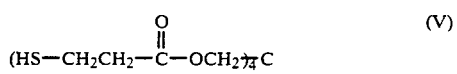

(V)

Typical examples of the phenol compounds represented by the formula (II)-3 and the formula (II)-4 are shown in Table 3 and Table 4, respectively.

TABLE 3

| No. | $R_2$ |
|---|---|
| II-3-1 | $-CH_3$ |
| II-3-2 | $-CH_2CH_3$ |
| II-3-3 | $-CHCH_2CH_3$ with $CH_3$ |
| II-3-4 | $-C(CH_3)_3$ |

TABLE 4

| No. | $R_2$ |
|---|---|
| II-4-1 | $-CH_3$ |
| II-4-2 | $-CH_2CH_3$ |
| II-4-3 | $-CHCH_2CH_3$ with $CH_3$ |
| II-4-4 | $-C(CH_3)_3$ |

Typical examples of the phenol compounds represented by the formula (III) are shown below.

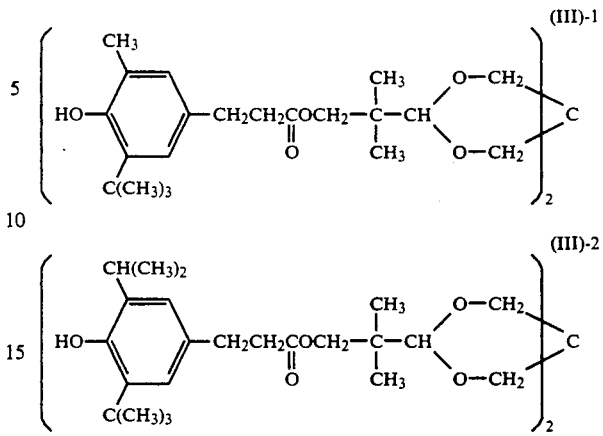

In the present invention, heat resistance of the composition is markedly improved by using sulfur compounds (D) and phenol compounds (E) in combination. The weight ratio is D:E=1:0.1–5, preferably 1:0.5–2.

If the weight ratio is outside the range of 1:0.1–5, substantially no improvement of heat resistance is attained or appearance of molded articles deteriorates due to addition of stabilizer in a large amount.

Moreover, inorganic fillers can be added in an amount of about 1–70 parts by weight to 100 parts by weight of the thermoplastic resin composition of the present invention. The inorganic fillers are preferably talc, mica, titanium oxide, clay, magnesium hydroxide, glass fibers, potassium titanate whiskers, carbon fibers and so on.

The composition of the present invention can also contain additives usually employed such as heat stabilizers, flame retardants, pigments, lubricants, and ultraviolet absorbers. Further, fiber reinforcing agents such as alumina fibers may also be added.

The method for producing the resin composition of the present invention is not limitative and any known methods can be employed.

A method in which the components are mixed in the form of solutions and solvents are evaporated or in which said mixture is precipitated in a non-solvent is effective. However, from industrial viewpoint, a method of kneading them in molten state is employed in practice. The melt kneading is carried out using such a kneading machine as generally used single-screw or twin-screw extruder and various kneaders. A twin-screw extruder is especially preferred.

It is preferred to uniformly blend respective resin components in the form of powder or pellet by using a mixer such as a tumbler or a Henschel mixer before kneading them. However, if necessary, each resin may be separately fed directly to a kneading apparatus through a metering device without the blending.

The kneaded resin composition can be molded by various molding methods such as injection molding, extrusion molding and other methods. The present invention further includes a method in which molded articles are obtained by dry-blending the components at the time of injection molding or extrusion molding and then directly kneading the components during operation of melt processing without the previous kneading.

There is no special limitation in sequence of kneading of the components, but preferably (ii) and (iii) are previously kneaded and then, the resulting composition is kneaded with (i).

The following nonlimiting examples further explain the invention.

The polyphenylene ether and a part of the stabilizers used in examples and comparative examples were prepared by the followed processes.

Commercially available ones were used as maleic anhydride, fumaric acid, 1,12-diaminododecane, citric acid, styrene, 1,3-bis(t-butylperoxyisopropyl) benzene, hexamethylolmethoxymelamine, polyamides, polyesters, polypropylenes and a part of stabilizers.

PREPARATION EXAMPLE 1

(1) Polyphenylene Ether

In a jacketed autoclave of 10 liters provided with a stirrer, a thermometer, a condenser and an air introduction pipe which extended to the bottom of the autoclave were charged 3,420 g of xylene, 1,366 g of methanol, 1,222 g (10 mols) of 2,6-dimethylphenol and 24 g (0.6 mol) of sodium hydroxide and a homogeneous solution was prepared therein. Thereafter, thereto was added a solution of 31.5 g (0.3 mol) of diethanolamine, 19.4 g (0.15 mol) of di-n-butylamine and 0.99 g (0.005 mol) of manganese chloride tetrahydrate in 100 g of methanol.

Then, air was blown into the content at a rate of 5 l/min under vigorous stirring. Reaction temperature and pressure were maintained at 35° C. and 9 kg/cm², respectively.

When 7 hours elapsed from starting of the air blowing, supply of the air was discontinued and the reaction mixture was introduced into a mixture of 66 g (1.15 mol) of acetic acid and 4,900 g of methanol. The resulting slurry was filtered under reduced pressure and polyphenylene ether in wet state was isolated. The isolated polyphenylene ether was washed with 7,200 g of methanol and dried under reduced pressure at 150° C. overnight to obtain 1,179 g of polyphenylene ether in dry state. This polyphenylene ether had a reduced viscosity of 0.54 dl/g measured in chloroform of 0.5 g/dl in concentration at 25° C.

PREPARATION EXAMPLE 2

Preparation of stabilizer II-2-1 having the following structural formula:

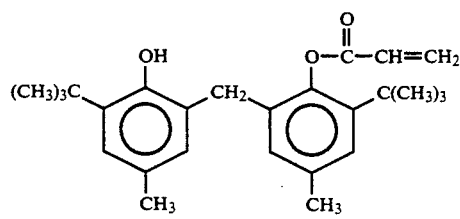

Preparation of (II-1)

In a 500 ml four-necked flask provided with a thermometer, a dropping funnel and a stirrer were charged 82.0 g (0.241 mol) of 2,2'-methylenebis(6-t-butyl-4-methylphenol), 200 g of toluene and 29.3 g (0.290 mol) of triethylamine and the air in the flask was replaced with nitrogen and the content was cooled to 1° C. A mixture of 25 g (0.276 mol) of acryloyl chloride and 50 g of toluene was added from the dropping funnel over 2 hours. After completion of the addition, excess triethylamine was neutralized with dilute hydrochloric acid and triethylamine hydrochloride was filtered off and the residue was washed with water and subjected to liquid separation. 180 g of toluene was distilled off and 50 g of n-hexane was added to the residue to carry out recrystallization to obtain 90.0 g (yield 95%) of white crystal of compound (II-2-1).

m.p. 133°-134° C.

Elemental analysis $C_{26}H_{34}O_3$ C; 79.34% (79.15%) H; 8.86% (8.69%)

The value in ( ) above is a calculated value.

PREPARATION EXAMPLE 3

Preparation of stabilizer (II-3-1) of the following formula:

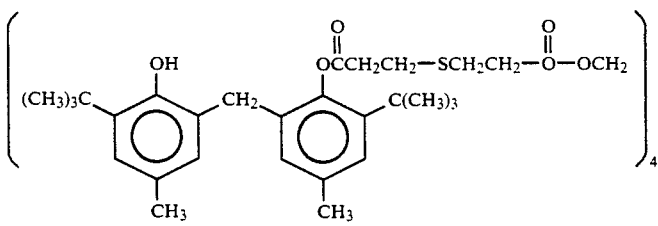

In a four-necked flask provided with a thermometer and a stirrer were charged 7.90 g (0.020 mol) of 2,2'-methylenebis(6-t-butyl-4-methylphenol) monoacrylate, 2.82 g (0.058 mol) of pentaerythritol 3-mercaptopropionate and 50 g of ethanol and the air in the flask was replaced with nitrogen, followed by adding 0.07 g (0.0007 mol) of triethylamine. Temperature was elevated and reaction was allowed to proceed for 10 hours under reflux. Then, the reaction mixture was cooled to 30° C., neutralized with dilute hydrochloric acid and extracted with chloroform. The organic layer was washed with water and then was concentrated to obtain 10.2 g (yield 99%) of white glassy compound (II-3-1).

m.p 76°-80° C.

Elemental analysis $C_{121}H_{164}O_{20}S_4$ C; 69.9% (70.32%) H; 8.2% (8.00%) S; 6.2% (6.21%)

The value in ( ) above is a calculated value.

PREPARATION EXAMPLE 4

Preparation of stabilizer (II-4-1) of the following formula:

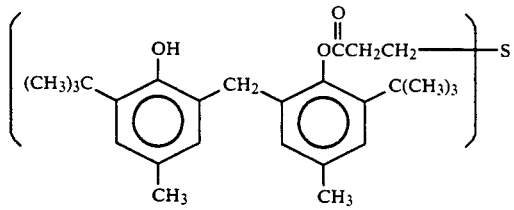

4.28 g of 3,3'-thiodipropionic acid, 50 g of toluene and 11.0 g of thionyl chloride were charged in a 300 ml four-necked flask and heated to 90° C. in a nitrogen stream and kept at that temperature for 3 hours. Then, excess thionyl chloride and toluene were distilled off under reduced pressure.

The resulting 3,3'-thiodipropionic acid dichloride and 13.62 g of 2,2'-methylenebis(6-t-butyl-4-methylphenol) were dissolved in 50 g of toluene and the solution was kept at 10° C. Thereto was added dropwise a solution of 4.9 g of triethylamine in toluene over 2 hours. After completion of the addition, triethylamine hydrochloride was filtered off and the solvent was distilled off under reduced pressure to obtain 16.3 g of a crude product. This was purified by silica gel chromatography and recrystallized from n-hexane to obtain white crystal of compound (II-4-1) having a melting point of 101.5°–103.0° C.

Elemental analysis $C_{52}H_{70}O_6S$ C; 75.8% (75.9%), H; 8.7% (8.6%), S; 3.8% (3.9%)

The value in ( ) above is a calculated value.

Resins, stabilizers and others used in the following examples and comparative examples are shown in Table 5.

EXAMPLE 1

From the components shown in Table 5, 80 parts by weight of the resin prepared in Preparation Example 1 as polyphenylene ether, 20 parts by weight of CARIFLEX ® TR1101 manufactured by Shell Chemical Co. as alkenyl aromatic elastomer, 1 part by weight of stabilizer (I)-2 and 1 part by weight of stabilizer (II)-1-1 were selected and mixed and the mixture was kneaded by Laboplastmill manufactured by Toyo Seiki Co. at a barrel temperature of 260° C. and a screw revolution speed of 90 rpm. for 5 minutes. The resulting resin composition was press molded to a thickness of 3.2 mm at 290° C. and then was cut. Notched Izod impact strength of the sample was measured and the result is shown in Table 6.

COMPARATIVE EXAMPLE 1

A resin composition was prepared in the same manner as in Example 1 except that stabilizer (I)-2 and stabilizer (II)-1-1 were not added and a sample was prepared and notched impact strength thereof was measured in the same manner as in Example 1. The result is shown in Table 6.

TABLE 5

| | |
|---|---|
| (i) (A) Polyphenylene ether | Preparation Example 1 |
| (i) (B) Polystyrene | GP-PS 8-62 (Japan Polyethylene Co.) |
| (i) (C) Polyamide | A1030BRL (Nylon 6 of Unitika Ltd.) |
| (i) (C) Polyester | PET SA1206 (Unitika Ltd.) |
| (i) (C) Polypropylene | NOBLEN ® D501 (Sumitomo Chemical Co., Ltd.) |
| (ii) SBS | CARIFLEX ® TR1101 (Shell Chemical Co.) |
| (ii) Maleic anhydride-modified SEBS | KRATON ®FG1901X (Shell Chemical Co.) |
| (iii) (d) Sulfur compound (i)-2 Comparative sulfur compound (VI) | $(H_{25}C_{12}CH_2CH_2COCH_2)_2C$ Dilaurylthiodipropionate |
| (iii) (E) Stabilizer (II)-1-1 | 2,2'-Methylenebis(6-t-butyl-4-alkylphenol) |
| (iii) (E) Stabilizer (II)-2-1 | Preparation Example 2 |
| (iii) (E) Stabilizer (II)-3-1 | Preparation Example 3 |
| (iii) (E) Stabilizer (II)-4-1 | Preparation Example 4 |
| (iii) (E) Stabilizer (III)-1 | SUMILIZER ® GA-80 (Sumitomo Chemical Co., Ltd.) |
| (iii) (E) Stabilizer (IV) | CYNOMIX ® 1970 (Japan Cyanamide Co.) |
| Comparative stabilizer (VII) | Tetrakis[methylene-3(3',5'-di-t-butyl-4-hydroxyphenyl)-propionate]methane |

TABLE 6

| | Example 1 | Comparative Example 1 |
|---|---|---|
| Polyphenylene ether | 80 | 80 |
| CARIFLEX ® TR1101 | 20 | 20 |
| Stabilizer (I)-2 | 1 | — |
| Stabilizer (II)-1-1 | 1 | — |
| Izod impact strength (notched) 23° C. | 32 | 5.8 |

EXAMPLES 2–10 AND COMPARATIVE EXAMPLES 2–8

The components were mixed as shown in Table 7 and Table 8 and the respective mixtures were granulated by a twin-screw extruder TEM-50 manufactured by Toshiba Machine Co. at a cylinder temperature of 260° C. to obtain resin compositions. The alkenyl aromatic elastomer and the stabilizers were previously granulated by a 40 mmφ single screw extruder at 180° C.

The resulting resin compositions were vacuum dried at 120° C. for 4 hours and test pieces were prepared therefrom by an injection molding machine IS220EN manufactured by Toshiba Machine Co. under the conditions of cylinder temperature 290° C., injection pressure 1200 kg/cm² and mold temperature of 80° C.

The resulting test pieces were tested by the following methods.

Izod impact strength was measured in accordance with ASTM D256 on notched test pieces of 3.2 mmt.

Heat aging of test pieces was measured by PHH200 manufactured by Tabai ESPEC Co. under the conditions of 140° C. and 100 hours.

The results are shown in Table 7 and Table 8.

TABLE 7

| | Example 2 | Comparative Example 2 | Example 3 | Example 4 | Example 5 | Example 6 | Comparative Example 3 |
|---|---|---|---|---|---|---|---|
| Polyphenylene ether | 45 | 45 | 50 | 50 | 50 | 50 | 50 |
| Polystyrene | 45 | 45 | — | — | — | — | — |
| Crystalline thermo- | — | — | Polyamide | Polyamide | Polyamide | Polyamide | Polyamide |

TABLE 7-continued

| | | | | | | | |
|---|---|---|---|---|---|---|---|
| plastic resin | | | 40 | 40 | 40 | 40 | 40 |
| CARIFLEX ® TR1101 | 10 | 10 | 10 | 10 | 10 | 10 | 10 |
| Sulfur compound | (I)-2 0.2 phr | — | (I)-2 0.2 phr | (I)-2 0.2 | (I)-2 0.2 | (I)-2 0.2 | — |
| Stabilizer | (II)-1-1 0.2 phr | — | (II)-1-1 0.2 phr | (II)-2-1 0.2 phr | (II)-3-1 0.1 phr | (II)-4-1 0.2 phr | — |
| Compatibilizing agent | — | — | Maleic anhydride 0.6 phr | Fumaric acid 0.5 phr | Maleic anhydride 0.6 phr | Maleic anhydride 0.6 phr | Maleic anhydride 0.6 phr |
| Izod (notched) 23° C. | 16.1 | 9.8 | 81 | 73 | 68 | 71 | 42 |
| Heat aging 140° C. 100 hr Izod (notched) 23° C. | — | — | 51 | 45 | 38 | 42 | 16.3 |
| Appearance of molded articles | — | — | Good | Good | Good | Good | Somewhat bad |

| | Comparative Example 4 | Example 7 | Example 8 | Comparative Example 5 | Comparative Example 6 | Example 9 | Comparative Example 7 |
|---|---|---|---|---|---|---|---|
| Polyphenylene ether | 50 | 50 | 50 | 50 | 50 | 40 | 40 |
| Crystalline thermoplastic resin | Polyamide 40 | Polyamide 40 | Polyamide 40 | Polyamide 40 | Polyamide 40 | Polyester 40 | Polyamide 40 |
| CARIFLEX ® TR1101 | 10 | — | 10 | 10 | 10 | 20 | 20 |
| KRATON ® FG1901 | — | 10 | — | — | — | — | — |
| Sulfur compound | (I)-2 0.2 phr | (I)-2 0.2 | (I)-2 0.2 | (I)-2 0.2 | (VI) 0.2 | (I)-2 0.5 | — |
| Stabilizer | (VI) 0.2 phr | (IV) 0.2 | (III)-1 0.2 | (II)-1- 3.0 | (II)-1-1 0.2 | (II)-1-1 0.5 | — |
| Compatibilizing agent | Maleic anhydride 0.6 | Maleic anhydride 0.4 | Citric acid 0.6 | Maleic anhydride 0.6 | Maleic anhydride 0.6 | Hexamethoxymethylolmelamine 2.0 | Hexamethoxymethylolmelamine 2.0 |
| Izod (notched) 23° C. | 65 | 67 | 78 | 43 | 53 | 18.3 | 1.5 |
| Heat aging 140° C. 100 hr Izod (notched) 23° C. | 21.3 | 35 | 43 | 24.3 | 16.7 | — | — |
| Appearance of molded articles | Good | Good | Good | Bad | Good | — | — |

TABLE 8

| | Example 10 | Comparative Example 8 |
|---|---|---|
| Polyphenylene ether | 25 | 25 |
| Crystalline thermoplastic resin | Polypropylene 75 | Polypropylene 75 |
| CARIFLEX ® TR1101 | 20 | 20 |
| KRATON ® FG1902 | | |
| | Stabilizer (I)-2 0.8 | — |
| | Stabilizer (II)-1-1 0.8 | — |
| Compatibilizing agent | 1,12 diaminodedecane 1 phr | " |
| | Maleic anhydride 1 phr | " |
| | Styrene 1 phr | " |
| | 1,3-bis(t-butylperoxy-isopropyl)benzene 0.1 phr | " |
| Izod 23° C. (notched) | 17.2 | 6.3 |

As explained above, the present invention provides a resin composition containing polyphenylene ether and having a high performance and high heat stability.

We claim:

1. A stabilized thermoplastic resin composition which comprises the following components (i), (ii) and (iii):
   (i) 100 parts by weight, based on the total amount of the following (A), (B) and (C), of a mixture comprising (A) about 10-100% by weight of a polyphenylene ether, (B) 0-about 90% by weight of an alkenyl aromatic resin, and (C) 0-about 90% by weight of a crystalline thermoplastic resin, total amount of (A) and (B) being at least about 15% by weight of the total amount of (A), (B) and (C),
   (ii) 1-50 parts by weight of an alkenyl aromatic elastomer (non-hydrogenated), and
   (iii) a stabilizer comprising (D) 0.01-5 parts by weight of a sulfur compound represented by the following formula (I) and (E) 0.01-5 parts by weight of at least one phenol compound represented by the following formulas (II)-1-(II)-4, (III) and (IV), the weight ratio of (D) and (E) being 1:0.1-5,

wherein $R_1$ represents an alkyl group of 4–20 carbon atoms,

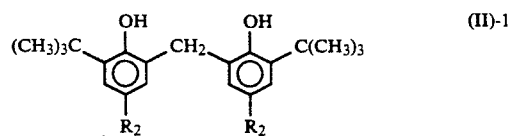

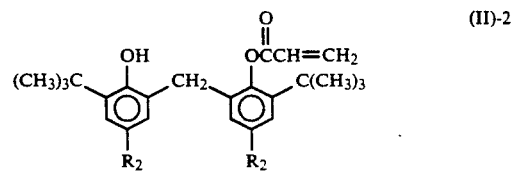

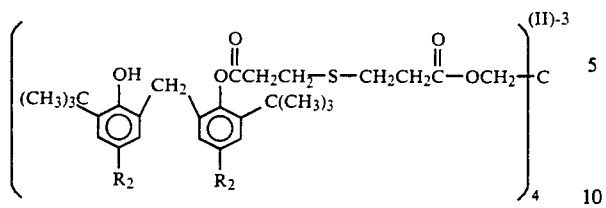

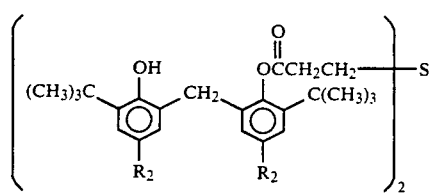

wherein $R_2$ represents an alkyl group of 1-4 carbon atoms,

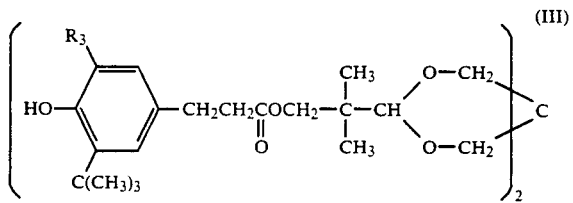

wherein $R_3$ represents an alkyl group of 1-3 carbon atoms,

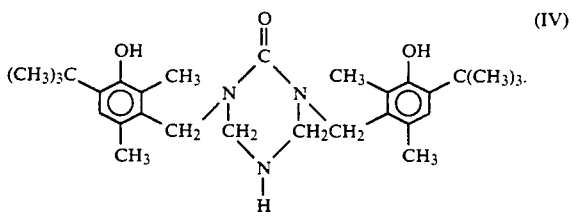

2. A resin composition according to claim 1, wherein the polyphenyl ether (i) (A) is a polymer obtained by oxidation polymerization of at least one phenol compound represented by the following formula:

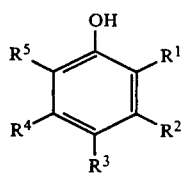

wherein $R^1$, $R^2$, $R^3$, $R^4$ and $R^5$ each represents a hydrogen atom, a halogen atom, a hydrocarbon group, or a substituted hydrocarbon group, with a proviso that at least one of $R^1$-$R^5$ is a hydrogen atom, with oxygen or an oxygen-containing gas using an oxidation coupling catalyst.

3. A resin composition according to claim 1, wherein the alkenyl aromatic resin (i) (B) is a resin which is partially or wholly derived from an alkenyl aromatic compound represented by the following formula:

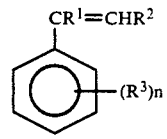

wherein $R^1$ and $R^2$ are independently selected from the group consisting of lower alkyl and alkenyl of 1-6 carbon atoms and hydrogen, n is an integer of 1-5 and $R^3$ is selected from the group consisting of hydrogen, chlorine, bromine and lower alkyl of 1-6 carbon atoms and when n is an integer of 2-5, $R^3$ may be identical or different.

4. A resin composition according to claim 1, wherein the crystalline thermoplastic resin (i) (C) is at least one resin selected from polyethylene, polypropylene, polyamide, thermoplastic polyester, polyacetal, polyphenylene sulfide and polyether ether ketone.

5. A resin composition according to claim 4, wherein the crystalline thermoplastic resin (i) (C) is a polyamide.

6. A resin composition according to claim 1, wherein the alkenyl aromatic elastomer (ii) is a copolymer comprising an alkenyl aromatic compound represented by the following formula:

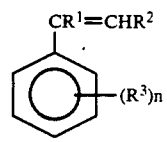

wherein $R^1$ and $R^2$ are independently selected from the group consisting of lower alkyl and alkenyl of 1-6 carbon atoms and hydrogen, n is an integer of 1-5 and when n is 1, $R^3$ is selected from the group consisting of hydrogen, chlorine, bromine and lower alkyl of 1-6 carbon atoms and when n is an integer of 2-5, $R^3$ which may be identical or different are independently selected from the group consisting of hydrogen, chlorine, bromine, and lower alkyl of 1-6 carbon atoms.

7. A resin composition according to claim 6, wherein the alkenyl aromatic elastomer (ii) is a styrene-butadiene-styrene block copolymer.

8. A resin composition according to claim 1, wherein the sulfur compound (iii) (D) is represented by the formula (I) wherein $R^1$ is an alkyl group of 3-18 carbon atoms.

9. A resin composition according to claim 8, wherein the sulfur compound (iii) (D) is represented by the following formula:

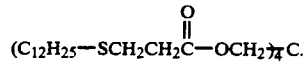

10. A resin composition according to claim 1, wherein the phenol compound (E) is represented by the following formula:

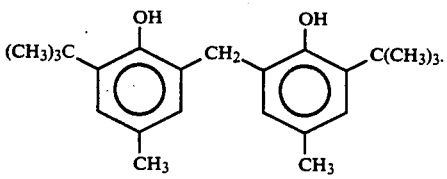

* * * * *